3,431,098
Patented Mar. 4, 1969

3,431,098
PROCESS IMPROVEMENTS IN THE MANUFACTURE OF COMPLEX FERTILIZERS
Honoré Trimbach, Grand-Couronne, and Pierre Dumont, Cleon, France, assignors to Potasse & Engrais Chimiques, Paris, France
No Drawing. Filed Mar. 11, 1966, Ser. No. 533,432
Claims priority, application France, Mar. 12, 1965, 8,968
U.S. Cl. 71—43     9 Claims
Int. Cl. C05g 1/06

This invention relates to improvements in a process of manufacturing NP (nitrogen, phosphorus) or NPK (nitrogen phosphorus potassium) containing complex fertilizers of the nitrate-sulfate type in which the available $P_2O_5$ content is partly in water-soluble form.

As already known, complex fertilizers of the nitrate-sulfate type are produced by first subjecting phosphate rock to digestion with nitric acid, followed by ammoniation, the digestion and/or ammoniation being performed in the presence of sulfate ions supplied either by sulfuric acid or water-soluble sulfates. If the latter is employed, it is preferable that the cationic portion be a nutrient element, such as ammonium or potassium. The nitrate-sulfate processes are well known and widely used for the manufacture of complex fertilizers wherein all of the available $P_2O_5$ is in the form of dicalcium phosphate which is insoluble in water but soluble in ammonium citrate.

The digestion of phosphate rock with nitric acid results in a very acidic reaction mixture composed mainly of calcium nitrate and phosphoric acid and/or monocalcium phosphate. During the subsequent ammoniation of the reaction mixture, dicalcium phosphate precipitates and calcium nitrate is partially converted into ammonium nitrate. The overall reactions occurring during digestion of phosphate rock and subsequent ammoniation of the reaction mixture can be shown as:

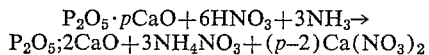

in which $p$ is, per mol of $P_2O_5$ present in phosphate rock, the molar quantity of CaO bound to phosphoric acid, to carbonic acid and to the portion of volatile acids evolved from the reaction mixture during the acid digestion of phosphate rock (small quantities of HF or derivatives thereof such as $SiF_4$ and $H_2SiF_6$). This quantity $p$ does not include the fraction of CaO also present in phosphate rock but bound to acids other than phosphoric acid which remain dissolved in the reaction mixture and which during ammoniation are recombined with calcium nitrate to give insoluble calcium salts. In the different phosphate rock types usually employed in fertilizer industry this ratio $p$ varies between about 3.3 and 4.25 or even higher for low-grade phosphate rock.

The presence of calcium nitrate in fertilizers to be marketed is disadvantageous because of the hygroscopicity of this salt. Consequently, it is desirable to add sulfate ions during the digestion and/or ammoniation stages to convert hygroscopic calcium nitrate to non-hygroscopic calcium sulfate according to the following equation:

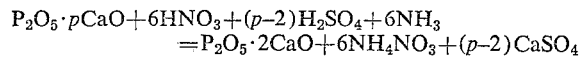

The final product is a mixture of dicalcium phosphate, ammonium nitrate and calcium sulfate. A potassium salt can also be added if desired.

A process has already been proposed in U.S. Patent No. 3,177,063 (assigned to Potasse & Engrais Chimiques) for the manufacture of a complex fertilizer in which $P_2O_5$ is available partly in a form soluble in water, and partly in a form insoluble, in water but soluble in ammonium citrate, both forms remaining stable during storage. According to this process, stabilizing metal ions must be added to the reaction mixture before its pH value reaches about 5 in order to (a) avoid reversion of water-soluble $P_2O_5$ to dicalcium phosphate, and (b) obtain a fertilizer in which the water-soluble $P_2O_5$ content and the citrate-soluble $P_2O_5$ content remain constant during drying and storage. The necessary quantity of sulfate ions can be added during the digestion step or gradually during the ammoniation step, or during both steps, but in any case before the pH value of the reaction mixture reaches 5, preferably 3.5. In this process the ammoniation is effected so that the pH value is increased steadily without sudden variations.

The quantity of sulfate ions introduced in the reaction mixture depends on the source of phosphate rock and on the proportion of water-soluble $P_2O_5$ desired in the final fertilizer. If $n$ is the ratio of the quantity of water-soluble $P_2O_5$ desired relative to the total quantity of $P_2O_5$, the molar quantity of sulfate ions per mol of total $P_2O_5$ to be used is equal to $(p-2+2n)$, $p$ having the previously indicated meaning as above. Thus, for the manufacture of a fertilizer containing only dicalcium phosphate and no water-soluble $P_2O_5$, i.e., when $n=0$, the quantity of sulfate ions to be used is equal to $(p-2)$. Beyond this value $(p-2)$ the quantity of sulfate ions to be added $(p-2+2n)$ increases with the proportion of water-soluble $P_2O_5$ desired in the final fertilizer.

For purposes of simplification, the quantity $(p-2+2n)$ of sulfate ions will be referred to in the following description as the "necessary quantity" of sulfate ions.

The addition of the relatively high quantity of sulfate ions necessary for the manufacture of a fertilizer containing a part of its available $P_2O_5$ content in water-soluble form, according to the methods commonly used heretofore, presents an inherent drawback. During such manufacture, a thickening (or gelling) of the reaction mixture results in a more or less firm paste. However, it is essential for rational operation that such fertilizer pastes be made sufficiently fluid. For example, it is indeed necessary that the pastes are made sufficiently fluid so that they can flow easily from one apparatus to another, and that they can be suitably stirred for a thorough mixing of the reactants, more particularly for the absorption of ammonia. In various methods of granulation, the resultant pastes are sprayed; and under such circumstances, they must be kept fluid until the end of the ammoniation.

It is, of course, always possible to increase the fluidity of the paste by dilution with water, but this method is not economically suitable since it substantially increases the drying costs, as well as the number or size of the drying equipment.

The principal object of this invention, therefore, is to provide an improved process wherein it is unnecessary to dilute the paste with water in order to obtain the desired fluidity.

According to the improved process of the present invention wherein phosphate rock is digested with nitric acid, optionally in the presence of a portion of the necessary quantity of sulfate ions, and the reaction mixture is subsequently ammoniated, the improvement in the process comprises (a) Ammoniating the reaction mixture until the pH value exceeds about 4.5;

(b) Adding to this reaction mixture sufficient quantities of sulfuric acid to reduce the pH value to about 2–3; and (c) Reammoniating the reaction mixture up to a pH value higher than 4.5, it being possible to repeat the two last steps of the process until the entire necessary quantity of surfuric acid has been added.

In the known processes the entire necessary quantity of sulfate ions is to be added during the digestion step, and/or gradually during the ammoniation step, so that the whole amount of acid is added before the ammoniation is completed, or preferably before the pH value of the reaction mixture reaches about 3.5. In all these processes, the ammoniation of the reaction mixture is conducted so that the pH value is steadily and gradually increased without any sudden variations in order to avoid the precipitation of calcium phosphates insoluble in ammonium citrate. In contrast, the main feature of the process of the present invention resides in the fact that the mixture is reacidulated after the ammoniation is substantially completed (i.e., preferably at least 90% completed) which reacidulation causes any precipitated phosphates to redissolve. Owing to this redissolution, the present process has the advantage of permitting a much faster and more easily controllable ammoniation of the reaction mixture as no special precautions need be taken before reacidulation in order to prevent the reversion of dicalcium phosphate to phosphates insoluble in ammonium citrate.

According to the process of the present invention a portion of the necessary quantity of sulfuric acid can be introduced during the digestion step and/or during the ammoniation step provided that the remaining portion of acid is sufficient to reduce the pH of the reaction mixture (which has been previously ammoniated beyond pH of 4.5) down to a value ranging between about 3 and 2. Alternatively, the total quantity of sulfuric acid can also be introduced all at once into the reaction mixture previously ammoniated beyond a pH value of 4.5. The operating method used depends upon the formulation of fertilizers to be manufactured and upon the origin of phosphate rock employed as raw material.

As mentioned hereinabove, the necessary quantity of sulfuric acid increases with the content of water-soluble $P_2O_5$ desired in the final fertilizer which content preferably varies from 20 to 75% based on the total $P_2O_5$. Hence, for a fertilizer having a rather high water-soluble $P_2O_5$ content, for example close to 50%, it is advantageous to introduce sulfuric acid in several portions during the various steps of the process (digestion and/or ammoniation and reacidifying). Likewise, when the formulation of the prepared fertilizer does not allow the addition of enough nitric acid to obtain a suitable solubilization of the $P_2O_5$ content of the ore, a part of the necessary quantity of sulfuric acid must be introduced during the digestion step to complete reaction. However in this latter case, it is, of course, necessary to reserve a quantity of sulfuric acid sufficient to reacidify the reaction mixture after ammoniation.

Heretofore the description of this invention has referred only to the use of sulfuric acid as a source of sulfate ion. But it is only during the reacidification step that sulfate ions must necessarily be introduced in form of sulfuric acid. In the other steps of the process (digestion and/or ammoniation) they can be fed in form of a soluble sulfate such as ammonium sulfate or potassium sulfate.

The reaction mixture obtained after digestion is ammoniated quickly up to a pH of at least 4.5, that is until the precipitation of dicalcium phosphate is substantially completed. It is however advisable to carry the ammoniation as far as possible, that is up to the point where the reaction mixture absorbs substantially no more ammonia. This specific point depends upon the formulation of the prepared fertilizer, but in most cases it corresponds to a pH value ranging between about 5 and about 7.

When the ammoniation has reached a suitable point the mixture is reacidified by addition of all or part of the sulfuric acid remaining after digestion, so that the dicalcium phosphate and other phosphates, if any were co-precipitated, are redissolved to form calcium sulfate and monocalcium phosphate soluble in the reaction mixture. The principal reaction takes place as follows:

(1) $2CaHPO_4 + H_2SO_4 = CaH_4(PO_4)_2 + CaSO_4$

It is known that the viscosity or consistency of a slurry not only depends upon the content of insolubles, but also on the physical characteristics of the insolubles. It has been observed that the fertilizer slurry containing the calcium sulfate formed as described hereinabove, according to reaction (1) from dicalcium phosphate and other precipitated calcium phosphates is more fluid than a slurry containing calcium sulfate precipitated prior to dicalcium phosphate formation, all other conditions and in particular the water content being identical.

The reacidification of the reaction mixture can be performed in one step or in several steps. The total quantity of acid can be added all at once if it is small enough not to cause the pH of the mixture to drop below 2. It is preferable that the final pH of the reaction mixture does not drop below 2.5 in order to avoid any risk of local "overacidification" during the operation which might cause a localized drop of the pH below 2.

After redissolution of the phosphates precipitated during a previous ammoniation, the reaction mixture is reammoniated. The monocalcium phosphate formed according to reaction (1) reacts with ammonia to give dicalcium phosphate and water-soluble ammonium phosphate according to the following equations:

(2) $CaH_4(PO_4)_2 + NH_3 = CaHPO_4 + NH_4H_2PO_4$
$CaH_4(PO_4)_2 + 2NH_3 = CaHPO_4 + (NH_4)_2HPO_4$

When the reacidification is performed in one single step the ammoniation is preferably continued up to a pH ranging between about 5 and 7, the final pH being determined by the desired formulation of fertilizer. When the necessary quantity of sulfuric acid to be introduced is too high to be added all at once without causing the pH to drop below the acceptable limit (pH=2), the acid is added in two or more portions. In this case the mixture is reammoniated after each addition of acid in order to raise the pH beyond 4.5 before the next addition. The reactions resulting from a second, a third, etc., addition of acid are more complex than in the case of a single addition or of a first addition. For indeed, while the first addition gives rise only to the reaction of sulfuric acid with precipitated phosphates, the following additions lead, besides to this reaction, to the formation of ammonium sulfonate according to the following equation:

(3) $2(NH_4)_2HPO_4 + H_2SO_4 = (NH_4)_2SO_4 + 2NH_4H_2PO_4$

The resulting ammonium sulfate reacts with the monocalcium phosphate of reaction (1) to produce calcium sulfate and water-soluble ammonium phosphate as indicated below:

(4) $CaH_4(PO_4)_2 + (NH_4)_2SO_4 = 2NH_4H_2PO_4 + CaSO_4$

It has been observed that when several successive additions of sulfuric acid are effected in order to reacidify the reaction mixture, the fertilizer slurry obtained is as fluid as that obtained with one single addition. Whatever may be the method used for reacidification, the last ammoniating operation must be performed with the usual precautions to avoid sudden pH variations causing formation of phosphates insoluble in ammonium citrate. Thus, another advantage of the present process is obvious since only the last ammoniation, ie., the introduction of a small fraction of the total quantity of ammonia, must be performed slowly and gradually, whereas in the heretofore known processes the whole quantity of ammonia had to be added with special precautions.

Of most importance, though, is that this improved process results in complex fertilizers of the nitrate-sulfate type which are sufficiently fluid so that they can be agitated, pumped, and sprayed—even though the water-soluble $P_2O_5$ content is very high. Of substantial economic importance is that this result can be obtained without increasing the water content of the paste; and that the process can be conducted in existing plants for the manufacture of complex fertilizers.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Two comparative tests were performed under identical conditions with the exception of the points of introduction of sulfuric acid: tests $A_1$ and $A_2$ were carried out according to the heretofore used method, and test $B_1$ was carried out according to the process of the present invention.

Test $A_1$ 30.5 kg. of Morocco phosphate (33.5% $P_2O_5$) were digested with 52 kg. nitric acid (40% $HNO_3$) and with 7.95 kg. sulfuric acid (98% $H_2SO_4$). Into the digestion vessel 7.5 kg. of magnesium sulfate ($MgSO_4 \cdot 7H_2O$) were also introduced under continuous agitation.

10 kg. of water were added to the digestion mixture and ammonia was introduced until the pH of the reaction mixture reached 2.8; then ammonia and 7.95 kg. of 98% sulfuric acid were simultaneously introduced so as to gradually raise the pH of the mixture. The ammoniation was continued until the pH reached about 5.2, the total quantity of ammonia added being 6.8 kg. To the resulting slurry were then added 17 kg. of potassium chloride (60% $K_2O$).

The resultant fertilizer slurry, though easy to spray, contained 31% water.

Test $A_2$

A test carried out under the same conditions as for test $A_1$ above, but using a more concentrated nitric acid (41.6 kg. of 50% nitric acid) and without adding water at the end of the acid digestion, gave an unmanageable reaction mixture the ammoniation of which was practically impossible.

Test $B_1$

The acid digestion was performed under the same conditions as in test $A_1$, but using nitric acid of higher concentration, i.e., 41.6 kg. of acid containing 50% $HNO_3$.

The ammoniation was then carried out by feeding ammonia to the reaction mixture at high rate until the pH value reached 5.6. Then, 7.95 kg. of 98% sulfuric acid were admixed to obtain an homogeneous mixture, the pH of the acidified reaction mixture being lowered to 2.6.

The slurry was then reammoniated until the pH value was increased 5.2, at which point 17 kg. of potassium chloride (60% $K_2O$) were added.

The resulting slurry was fluid and easy to spray, and had a water content of only 23%.

From the results of the above tests it is possible to calculate the quantity of water to be evaporated from the slurries so as to obtain one metric ton of commercial-grade product:

|  | Kg. |
|---|---|
| Test $A_1$ | 423 |
| Test $B_1$ | 275 |

With the process of the present invention there is a reduction of 148 kg. of water with respect to the amount of water to be evaporated per metric ton of end product, i.e., a 35% economy compared to the usual process.

The commercial-grade fertilizer obtained with the slurries of tests $A_1$ and $B_1$ contained 10.0% N, 10.1% available $P_2O_5$, 3.7% of which are water-soluble, and 10.0% of $K_2O$. The water content of the marketable product was 1.9%.

EXAMPLE 2

Two comparative tests were performed, as follows:

Test $A_2$ 39.5 kg. of Morocco phosphate having the same composition as that of Example 1 were digested with 58.8 kg. nitric acid (41.5% $HNO_3$) and with 10.2 kg. of 98% sulfuric acid. The digestion was performed in the presence of 2 kg. of magnesium sulfate ($MgSO_4 \cdot 7H_2O$). 12 kg. of water were added to the digestion mixture; ammonia was introduced until the pH of the reaction mixture reached 2.6, then simultaneously ammonia and sulfuric acid were fed so as to gradually raise the pH of the mixture. 13.7 kg. of acid were thus introduced before the pH of the mixture reached 3.5. The ammoniation was continued until the pH reached 5.1.

The resulting fertilizer slurry was suitably fluid, but contained 35% water.

Test $B_2$

The acid digestion was effected under the same conditions as in the test $A_2$, but using 48.8 kg. of nitric acid of 50% strength, i.e., introducing 10 kg. water less into the digestion mixture.

Ammonia was then fed into this mixture until the pH reached 2.6. The introduction of ammonia was continued at higher rate and sulfuric acid was simultaneously added so as to raise the pH to 3.5, thus introducing 2.45 kg. of 98% sulfuric acid. Ammonia only was then introduced until the pH of the reaction mixture reached 5.

5 kg. of 98% sulfuric acid were then added to the reaction mixture, thus causing the pH to drop down to 3. Ammonia was then fed at high rate to the mixture until the pH reached 5, and at this point a further addition of 6.4 kg. sulfuric acid caused the pH to drop to 2.8. Finally the mixture was gradually ammoniated to a pH of 5.1.

The resultant slurry was fluid and easy to spray, and had water content of only 22%.

The amount of water to be evaporated from the slurries so as to obtain one metric ton of commercial-grade fertilizer containing 2% of water was:

|  | kg. |
|---|---|
| Test $A_2$ | 500 |
| Test $B_2$ | 255 | i.e., 245 kg. less when using the process of the present invention, equivalent to a 49% economy in energy costs for evaporation.

After the slurries of tests $A_2$ and $B_2$ were dried, the finally obtained marketable fertilizer contained 13.3% N, 13.4% available $P_2O_5$ (6.6% being water-soluble) and a water content of 2%.

It is to be noted that all the pH values indicated in the above description were measured conventionally as follows: to 10 g. of fertilizer slurry are added 100 g. of distilled water. The mixture is stirred for 10 minutes, and then filtered. The pH of the filtrate is then measured.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Conseqeutnly, such changes and modifications are properly, equitably, and intended to be, within the full range of equivalence of the following claims.

What is claimed is:

1. In a process for the production of complex fertilizers comprising a nitrate, a sulfate and water-soluble $P_2O_5$, which process comprises digesting phosphate rock with nitric acid; adding sulfate ions in order to form water-soluble $P_2O_5$; and ammoniating the digested reaction mixture, the improvement in said process comprising:
- (a) ammoniating said digested reaction mixture to a pH higher than about 4.5;
- (b) adding sufficient sulfuric acid to lower the resultant ammoniated reaction mixture of step (a) to a pH of about 2–3; and
- (c) re-ammoniating the resultant acidified reaction mixture from step (b) to a pH higher than about 4.5; whereby there are obtained less viscous reaction mixtures as compared to a process wherein steps (b) and (c) are not included.

2. A process as defined by claim 1 further comprising the steps of repeating steps (b) and (c) in sequence, whereby sulfate ion is added during a plurality of sulfuric acid addition steps subsequent to ammoniation steps.

3. A process as defined by claim 1 wherein the pH in step (a) is 5–7.

4. A process as defined by claim 1 wherein the pH in step (b) is 2.5–3.

5. A process as defined by claim 1 wherein the pH in step (c) is 5–7.

6. A process as defined by claim 3 wherein the pH in step (b) is 2.5–3.

7. A process as defined by claim 4 wherein the pH in step (c) is 5–7.

8. A process as defined by claim 1 wherein sulfuric acid is added to said nitric acid for digesting said phosphate rock.

9. A process as defined by claim 2 wherein sulfuric acid is added to said nitric acid for digesting said phosphate rock.

References Cited

UNITED STATES PATENTS 1,856,187  5/1932  Johnson _____ 23—107

DONALL SYLVESTER, *Primary Examiner.*

R. D. BAJEFSKY, *Assistant Examiner.*

U.S. Cl. X.R.

23—107; 71—34, 39